United States Patent
Tomita et al.

(10) Patent No.: US 9,954,238 B2
(45) Date of Patent: Apr. 24, 2018

(54) FUEL CELL SYSTEM AND METHOD FOR CONTROLLING FUEL CELL SYSTEM

(71) Applicant: NISSAN MOTOR CO., LTD., Yokohama-shi, Kanagawa (JP)

(72) Inventors: Yosuke Tomita, Yokohama (JP); Hayato Chikugo, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 173 days.

(21) Appl. No.: 14/778,414

(22) PCT Filed: Feb. 14, 2014

(86) PCT No.: PCT/JP2014/053431
§ 371 (c)(1),
(2) Date: Sep. 18, 2015

(87) PCT Pub. No.: WO2014/148164
PCT Pub. Date: Sep. 25, 2014

(65) Prior Publication Data
US 2016/0285117 A1    Sep. 29, 2016

(30) Foreign Application Priority Data
Mar. 22, 2013   (JP) ................ 2013-059817

(51) Int. Cl.
*H01M 8/04746*   (2016.01)
*H01M 8/04082*   (2016.01)
(Continued)

(52) U.S. Cl.
CPC ... *H01M 8/04753* (2013.01); *H01M 8/04104* (2013.01); *H01M 8/04201* (2013.01);
(Continued)

(58) Field of Classification Search
CPC ......... H01M 8/04753; H01M 8/04104; H01M 8/04395; H01M 8/04776; H01M 8/04373;
(Continued)

(56) References Cited

U.S. PATENT DOCUMENTS

2013/0089801 A1   4/2013   Takeshita et al.

FOREIGN PATENT DOCUMENTS

| JP | 2005-32502 A | 2/2005 |
|---|---|---|
| JP | 2005-251694 A | 9/2005 |

(Continued)

*Primary Examiner* — Nicholas P D'Aniello
(74) *Attorney, Agent, or Firm* — Foley & Lardner LLP (57) ABSTRACT

A fuel cell system supplies anode and cathode gases, and generates power through an electrochemical reaction of the gases in accordance with a load. The system includes a compressor that supplies the cathode gas to a fuel cell stack, and a pressure regulator valve that adjusts the pressure of the cathode gas in the fuel cell stack. The system sets a target cathode pressure based on a power generation request to the fuel cell stack, and controls an operation amount of the compressor and an opening degree of a pressure regulator valve based on the target cathode pressure. The temperature of air discharged by the compressor is restricted to an upper temperature limit by restricting the operation amount of the compressor and/or the opening degree of the pressure regulator valve based on two parameters, i.e., the inlet temperature and the torque of the compressor.

6 Claims, 9 Drawing Sheets

(51) Int. Cl.
   *H01M 8/0432* (2016.01)
   *H01M 8/04537* (2016.01)
   *H01M 8/04089* (2016.01)
   *H01M 8/0438* (2016.01)
   *H01M 8/1018* (2016.01)

(52) U.S. Cl.
   CPC ... *H01M 8/04373* (2013.01); *H01M 8/04395* (2013.01); *H01M 8/04604* (2013.01); *H01M 8/04776* (2013.01); *H01M 2008/1095* (2013.01)

(58) Field of Classification Search
   CPC ......... H01M 8/04201; H01M 8/04604; H01M 2008/1095
   See application file for complete search history.

(56) References Cited

FOREIGN PATENT DOCUMENTS

| | | |
|---|---|---|
| JP | 2006-6088 A | 1/2006 |
| JP | 2007-87819 A | 4/2007 |
| JP | 2009-123550 A | 6/2009 |
| JP | 2010-130806 A | 6/2010 |
| JP | 2012-3957 A | 1/2012 |

FUEL CELL SYSTEM AND METHOD FOR CONTROLLING FUEL CELL SYSTEM

TECHNICAL FIELD

The present invention relates to a fuel cell system and a control method for a fuel cell system.

BACKGROUND ART

A fuel cell system according to JP2012-003957A controls the flow rate of a cathode gas using a compressor provided in a cathode gas supply passage, and controls the pressure of the cathode gas using a pressure regulator valve provided in a cathode gas discharge passage.

SUMMARY OF INVENTION

When driving on a climbing road in an environment under a high ambient temperature, the temperature of air discharged by a compressor may undesirably increase due to the high ambient temperature. For this reason, it is crucial to restrict the temperature of air discharged by the compressor to an upper temperature limit so as to ensure the heat resistance of components located downstream relative to the compressor against an increase in the discharge temperature of the compressor.

In view of the foregoing issue, it is possible to locate a temperature sensor downstream relative to the compressor, and adjust the air pressure in the compressor using a value detected by the temperature sensor so that the outlet temperature of the compressor matches the upper temperature limit. Instead of locating a temperature sensor downstream relative to the compressor, it is also possible to locate sensors for detecting pressures upstream and downstream relative to the compressor, and estimate the outlet temperature of the compressor by computing a pressure ratio and the amount of temperature increase from the pressure ratio, and adding the amount of temperature increase to an inlet temperature of the compressor.

However, either locating a temperature sensor downstream relative to the compressor, or locating pressure sensors upstream and downstream relative to the compressor, incurs an unnecessary cost increase.

The present invention has been made with a focus on the foregoing problem. It is an object of the present invention to provide a technique to restrict a temperature downstream relative to a compressor to an upper temperature limit using a method different from the use of a temperature sensor located downstream relative to the compressor or pressure sensors located upstream and downstream relative to the compressor.

One aspect of the present invention is a fuel cell system for supplying an anode gas and a cathode gas, and generating power through an electrochemical reaction of the anode gas and the cathode gas in accordance with a load. Further, the fuel cell system includes a compressor for supplying the cathode gas to a fuel cell stack and a pressure regulator valve for adjusting a pressure of the cathode gas in the fuel cell stack. Furthermore, in the fuel cell system, a target cathode pressure is set based on a power generation request to the fuel cell stack, and an operation amount of the compressor and an opening degree of the pressure regulator valve is controlled based on the target cathode pressure. The operation amount of the compressor and/or the opening degree of the pressure regulator valve also is restricted based on two parameters, the two parameters being an inlet temperature of the compressor and a torque of the compressor.

DESCRIPTION OF EMBODIMENTS

The following describes embodiments of the present invention with reference to the attached drawings.

(First Embodiment)

Figure 1:
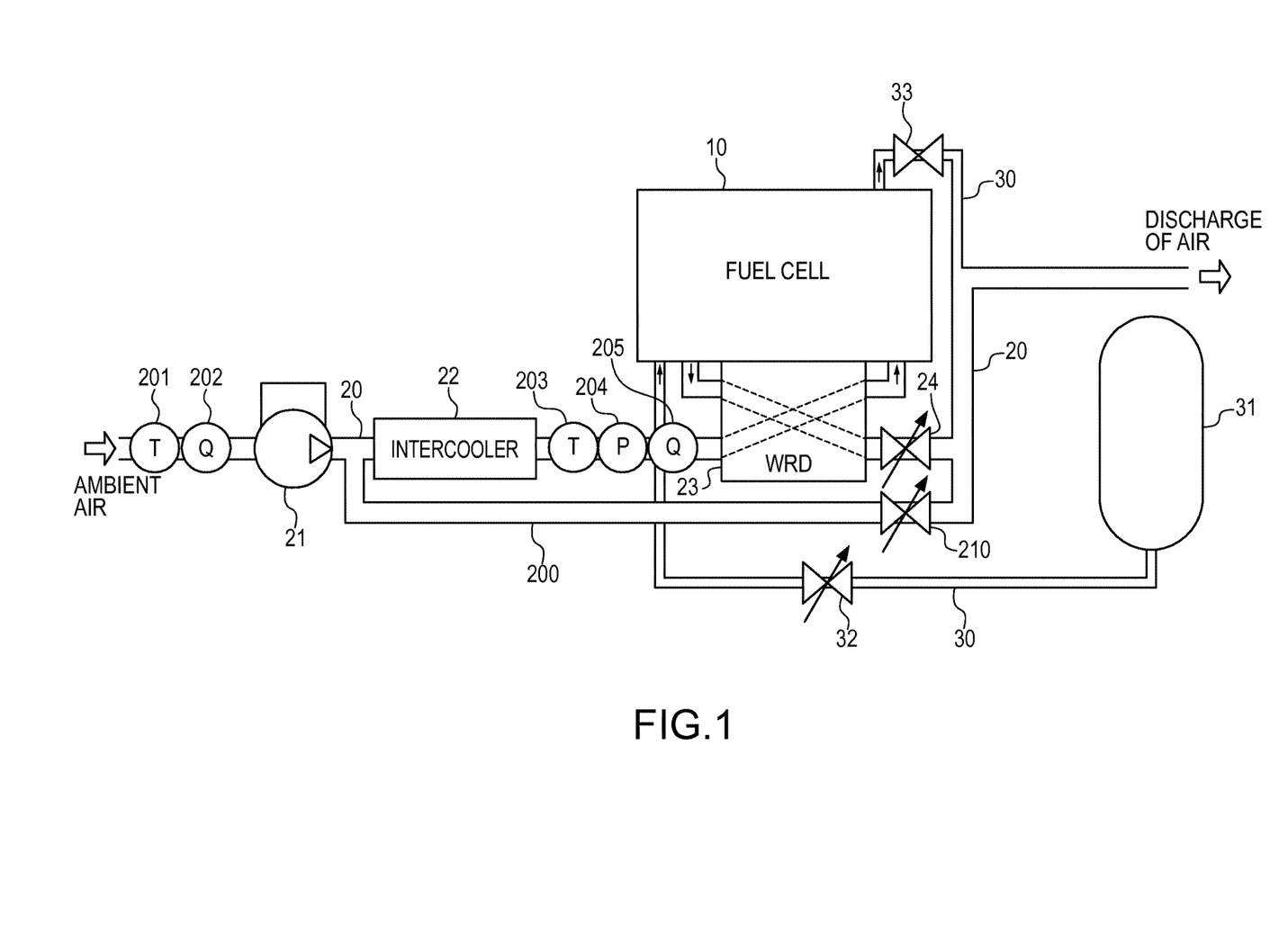
FIG. 1 shows a basic configuration of a fuel cell system according to a first embodiment of the present invention.

FIG. 1 shows a basic configuration of a fuel cell system according to a first embodiment of the present invention.

First, the basic configuration of the fuel cell system according to the present embodiment will be described with reference to FIG. 1.

A fuel cell stack 10 generates power with reactant gases (a cathode gas and an anode gas) supplied thereto while electrolyte membranes are maintained in a moderate moisture state. For the purpose of this, a cathode line 20 and an anode line 30 are connected to the fuel cell stack 10.

A cathode gas supplied to the fuel cell stack 10 flows through the cathode line 20. The cathode line 20 is provided with a compressor 21, an intercooler 22, a water recovery device (WRD) 23, and a pressure regulator valve 24. A bleed line 200 is arranged in parallel with the cathode line 20. The bleed line 200 diverges at a position that is downstream relative to the compressor 21 and upstream relative to the intercooler 22, and merges at a position that is downstream relative to the pressure regulator valve 24. Due to such a configuration, a part of air blown by the compressor 21 flows through the bleed line 200, bypassing the fuel cell stack 10. The bleed line 200 is provided with a bleed valve 210.

In the present embodiment, the compressor 21 is, for example, a centrifugal turbo compressor. In the cathode line 20, the compressor 21 is located upstream relative to the intercooler 22. The compressor 21 is driven by a motor. The compressor 21 adjusts the flow rate of a cathode gas flowing through the cathode line 20. The flow rate of the cathode gas is adjusted by the rotational speed and the torque of the compressor 21.

The intercooler 22 is located downstream relative to the compressor 21 and upstream relative to the WRD 23. The intercooler 22 cools air that is discharged from the compressor 21 and introduced into the fuel cell stack 10.

The WRD 23 humidifies the air that is introduced into the fuel cell stack 10. The WRD 23 includes a humidified part through which gas to be humidified flows, and a humidifier part through which gas containing water, that is to say, a source of humidification, flows. Air introduced by the compressor 21 flows through the humidified part. The gas that contains water by having passed through the fuel cell stack 10 flows through the humidifier part.

In the cathode line 20, the pressure regulator valve 24 is located downstream relative to the fuel cell stack 10. The pressure regulator valve 24 adjusts the pressure of the cathode gas flowing through the cathode line 20. The pressure of the cathode gas is adjusted by an opening degree of the pressure regulator valve 24.

The temperature of a cathode gas suctioned to the compressor 21 is detected by a cathode temperature sensor 201. This cathode temperature sensor 201 is located upstream relative to the compressor 21.

The flow rate of the cathode gas suctioned to the compressor 21 is detected by a cathode flow rate sensor 202. This cathode flow rate sensor 202 is located upstream relative to the compressor 21. A value detected by the cathode flow rate sensor 202 is input to a controller of the fuel cell system. For example, the controller controls the compressor 21 so that the value detected by the cathode flow rate sensor 202 is equal to a target value of the discharge flow rate of the compressor 21.

The temperature of a cathode gas at the inlet of the WRD 23 is detected by a cathode temperature sensor 203. This cathode temperature sensor 203 is located downstream relative to the intercooler 22 and upstream relative to the WRD 23. The pressure of the cathode gas at the inlet of the WRD 23 (WRD inlet pressure) is detected by a cathode pressure sensor 204. This cathode pressure sensor 204 is located downstream relative to the intercooler 22 and upstream relative to the WRD 23.

It should be noted that, in the present embodiment, the presence of the WRD 23 makes values detected by the sensors 203, 204 different from values right in front of the fuel cell stack. However, since a pressure loss caused by the WRD 23 and the like are already known, the pressure of a cathode gas supplied to the fuel cell stack and the like can be obtained from such detection signals. That is to say, a cathode pressure and a cathode flow rate mentioned in the claims can be considered synonymous with the WRD inlet pressure and the WRD inlet flow rate.

The flow rate of the cathode gas at the inlet of the WRD 23 (WRD inlet flow rate) is detected by a stack flow rate sensor 205. This stack flow rate sensor 205 is located downstream relative to the intercooler 22 and upstream relative to the WRD 23. It should be noted that the flow rate of the cathode gas flowing through the fuel cell stack 10 is the same as the flow rate detected by this stack flow rate sensor 205. A value detected by the stack flow rate sensor 205 is input to the controller. For example, when a supply flow rate which is requested from the compressor 21 according to a hydrogen dilution request is higher than a requested stack flow rate that is necessary for generating power by the fuel cell stack 10, the controller controls an opening degree of the bleed valve 210 so that the value detected by the stack flow rate sensor 205 is equal to the requested stack flow rate.

The bleed valve 210 is provided in the bleed line 200. The bleed valve 210 adjusts the flow rate of a cathode gas sent to the fuel cell stack 10 by adjusting the flow rate of a cathode gas escaping into the bleed line 200.

An anode gas supplied to the fuel cell stack 10 flows through the anode line 30. The anode line 30 is provided with a tank 31, an anode pressure regulator valve 32, and a purge valve 33. A portion of the anode line 30 located downstream relative to the purge valve 33 merges with a portion of the cathode line 20 located downstream relative to the pressure regulator valve 24.

The tank 31 stores an anode gas (hydrogen, $H_2$) in a high pressure state. The tank 31 is located most upstream in the anode line 30.

The anode pressure regulator valve 32 is located downstream relative to the tank 31. The anode pressure regulator valve 32 adjusts the pressure of an anode gas that is newly supplied from the tank 31 to the anode line 30. The pressure of the anode gas is adjusted by an opening degree of the anode pressure regulator valve 32.

The purge valve 33 is located downstream relative to the fuel cell stack 10. When the purge valve 33 opens, the anode gas is purged.

Figure 2A:
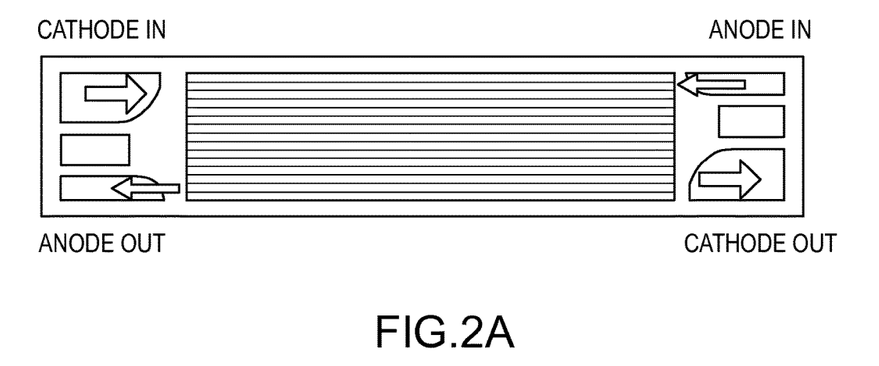
FIG. 2A is a schematic diagram showing a membrane electrode assembly in a fuel cell stack.
Figure 2B:
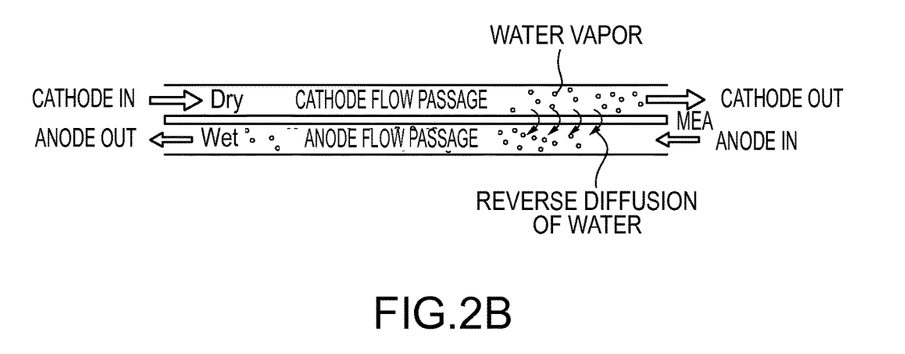
FIG. 2B is a schematic diagram illustrating a reaction in electrolyte membranes in the fuel cell stack.

FIGS. 2A and 2B are schematic diagrams illustrating a reaction in the electrolyte membranes in the fuel cell stack.

The fuel cell stack 10 generates power with reactant gases (oxygen, $O_2$, in the air, and hydrogen, $H_2$) supplied thereto. The fuel cell stack 10 is composed of several hundred membrane electrode assemblies (MEAs) arranged in a stack. Each MEA has a cathode electrode catalyst layer and an anode electrode catalyst layer formed on both surfaces of an electrolyte membrane. FIG. 2A shows one of the MEAs. In an example shown in FIG. 2A, a cathode gas is supplied to the MEA (cathode in) and discharged from the opposite corner (cathode out). FIG. 2A also shows that an anode gas is supplied thereto (anode in) and discharged from the opposite corner (anode out).

Each membrane electrode assembly (MEA) generates power through the progress of the following reaction in the anode electrode catalyst layer and the cathode electrode catalyst layer in accordance with a load.

[Chem. 1]

(1-1) Anode electrode catalyst layer: $2H_2 \rightarrow 4H^+ + 4e^-$ \hfill (1-1)

(1-2) Cathode electrode catalyst layer: $4H^+ + 4e^- + O_2 \rightarrow 2H_2O$ \hfill (1-2)

As shown in FIG. 2B, the reaction of the above expression (1-2) progresses as a reactant gas (oxygen, $O_2$, in the air) flows through a cathode flow passage, resulting in the production of water vapor. The relative humidity thus increases in a downstream side of the cathode flow passage. As a result, a relative humidity difference between the cathode side and the anode side increases. With this relative humidity difference serving as a driving force, water is reverse-diffused and the anode upstream side is humidified. Furthermore, this moisture evaporates through the MEA toward an anode flow passage, and humidifies a reactant gas (hydrogen, $H_2$) flowing through the anode flow passage. It is then carried to the anode downstream side and humidifies the MEA at the anode downstream side.

If the temperature of the cathode gas discharged by the compressor 21 is too high, this temperature may exceed a heat resistance temperature of components located downstream relative to the compressor. In this case, it is desirable to reduce the temperature of the cathode gas discharged from the compressor. One way to achieve this temperature decrease is to reduce the pressure of the cathode gas discharged from the compressor. The discharge temperature of the compressor can be detected by providing a temperature sensor at the outlet of the compressor, and by providing sensors that detect the inlet pressure and the outlet pressure of the compressor.

However, randomly increasing the number of sensors leads to a cost increase.

In view of this, the present embodiment provides a technique to restrict the discharge pressure of the compressor using a method different from the use of a temperature sensor located downstream relative to the compressor or pressure sensors located upstream and downstream relative to the compressor. The specifics of this method will now be described.

Figure 3:
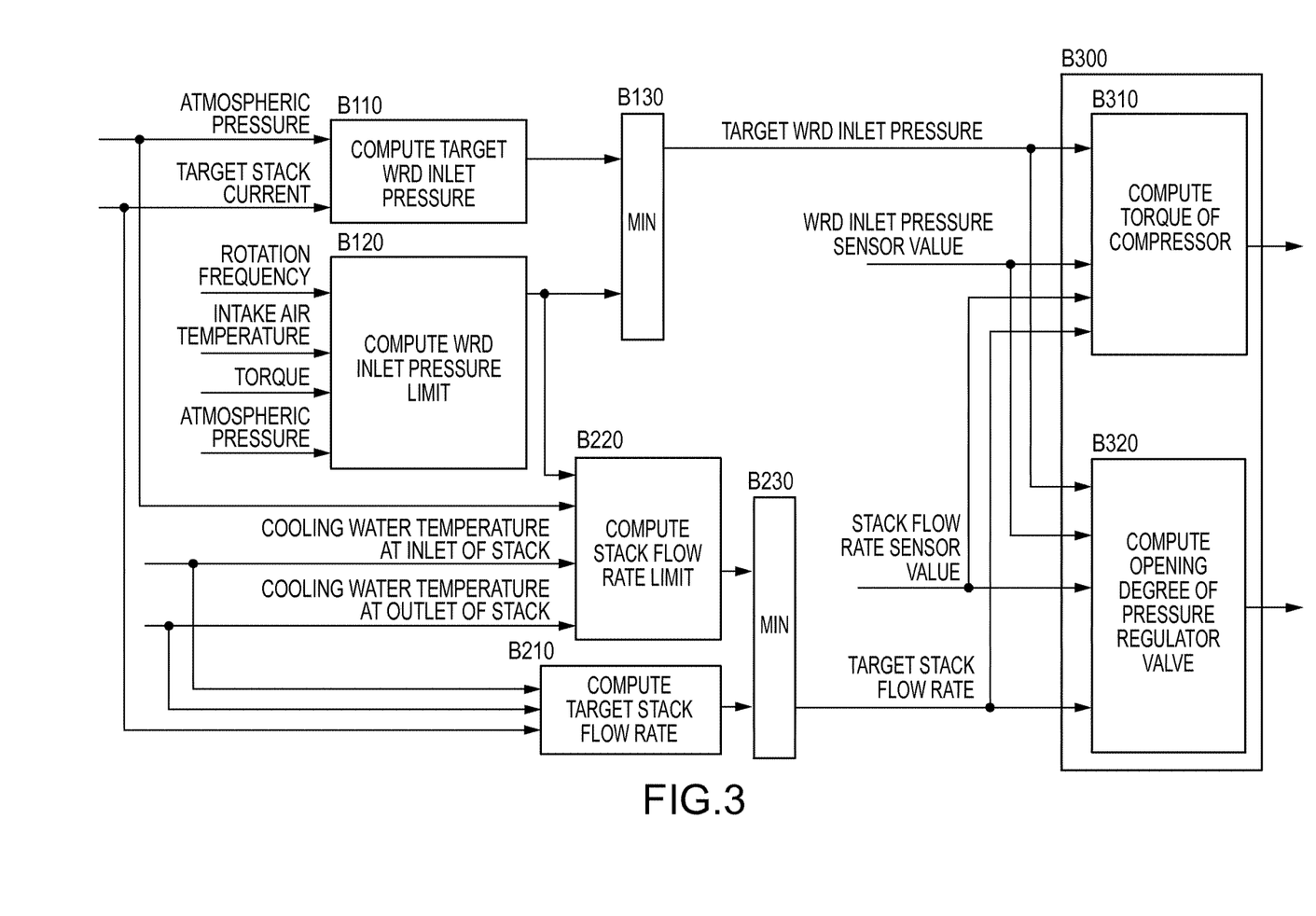
FIG. 3 is a control block diagram showing the substance of control according to the present embodiment.

FIG. 3 is a control block diagram showing the substance of control according to the present embodiment. In FIG. 3, functions of the controller of the fuel cell system are represented by control blocks.

A target WRD inlet pressure computation block B110 computes a minimum air pressure required to ensure an oxygen partial pressure. Air is supplied to the fuel cell stack as a cathode gas. Oxygen, $O_2$, in the air reacts as indicated by the aforementioned expression (1-2), thereby resulting in a power generation reaction. The larger the target power generation current (target stack current) for the fuel cell stack 10, the larger the necessary power generation reaction, and the more the necessary reactant gases (oxygen, $O_2$, in the air and hydrogen, $H_2$). The air also includes nitrogen, $N_2$, and the like. For this reason, this block B110 computes the minimum air pressure required to ensure an oxygen partial pressure so as to ensure oxygen, $O_2$, necessary for the power generation reaction. Specifically, the block B110 computes a target WRD inlet pressure based on the atmospheric pressure and the target stack current.

A WRD inlet pressure limit computation block B120 computes a pressure limit value at the inlet of the WRD 23. This pressure limit value is necessary for preventing the air discharged by the compressor from having an excessive temperature. As mentioned above, if the temperature of the air discharged from the compressor is high, the electrolyte membranes in the fuel cell dry easily. In this case, it is desirable to reduce the temperature of the air discharged from the compressor. One way to reduce the temperature of the discharged air is to reduce the pressure of the air discharged from the compressor. The block B120 accordingly computes the pressure limit value. Specifically, the block B120 computes the pressure limit value based on the rotation frequency of the compressor 21, the air temperature, the torque, and the atmospheric pressure. This will be described later in more detail.

A minimum select block B130 compares the target WRD inlet pressure output from the target WRD inlet pressure computation block B110 with the pressure limit value output from the WRD inlet pressure limit computation block B120, and outputs a smaller one of them as a target WRD inlet pressure. That is to say, if the target WRD inlet pressure from the block B110 is higher than the pressure limit value, the restriction is performed using the pressure limit value.

A target stack flow rate computation block B210 computes a minimum air flow rate required to ensure an oxygen partial pressure. Specifically, the block B210 computes a target stack flow rate based on the target stack current and the cooling water temperatures at the inlet and outlet of the fuel cell stack 10.

A stack flow rate limit computation block B220 computes a limit value of the flow rate of air supplied to the stack required in association with the pressure limit output from the WRD inlet pressure limit computation block B120. Specifically, the block B220 computes a flow rate limit based on the pressure limit, the atmospheric pressure, and the cooling water temperatures at the inlet and outlet of the fuel cell stack. This will be described later in more detail.

A minimum select block B230 compares the target stack flow rate output from the target stack flow rate computation block B210 with the flow rate limit value output from the stack flow rate limit computation block B220, and outputs a smaller one of them as a target flow rate of the air supplied to the stack. That is to say, if the target stack flow rate from the block B210 is higher than the flow rate limit value, the restriction is performed using the flow rate limit value.

A control block B300 includes a compressor torque computation block B310 and a pressure regulator valve opening degree computation block B320.

The compressor torque computation block B310 computes a torque input to the compressor 21 as an instruction, based on the target WRD inlet pressure, a WRD inlet pressure sensor value, a stack flow rate sensor value, and the target stack flow rate. The compressor 21 is controlled based on such the instruction value.

The pressure regulator valve opening degree computation block B320 computes an opening degree that is issued to the pressure regulator valve 24 as an instruction based on the target WRD inlet pressure, the WRD inlet pressure sensor value, the stack flow rate sensor value, and the target stack flow rate. The pressure regulator valve 24 is controlled based on such an instruction value.

Figure 4:
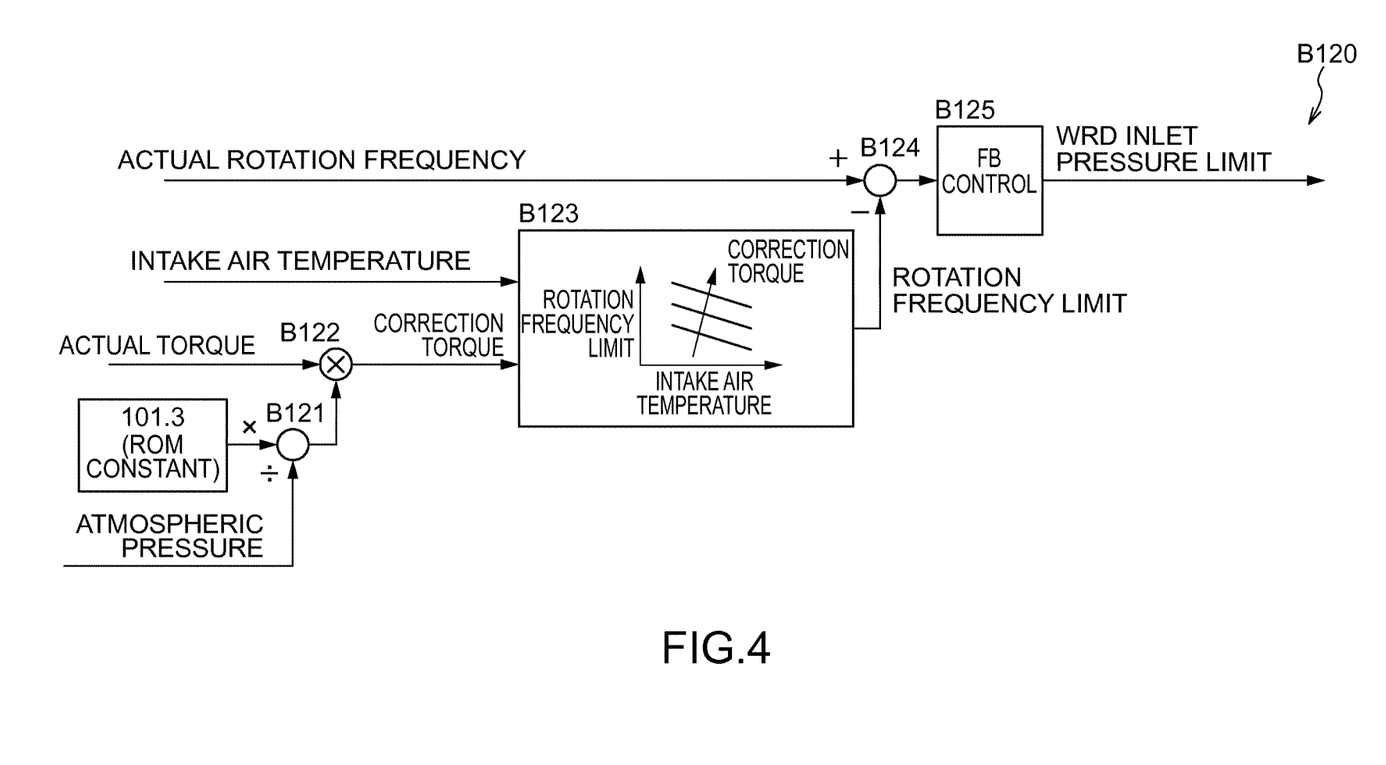
FIG. 4 illustrates a detail of a WRD inlet pressure limit computation block.

FIG. 4 illustrates a detail of the WRD inlet pressure limit computation block B120.

A correction value computation block B121 obtains a correction value for correcting a rotation frequency limit of the compressor 21 by dividing a ROM constant by the atmospheric pressure. In the present embodiment, in order to restrict the discharge temperature of the compressor 21 to a constant temperature, e.g., 200° C., the rotation frequency of the compressor 21 is restricted based on the torque of the compressor 21. Even if the torque of the compressor 21 is constant, the rotation frequency limit changes depending on the environment in which the fuel cell system is used, e.g., the atmospheric pressure.

Figure 5:
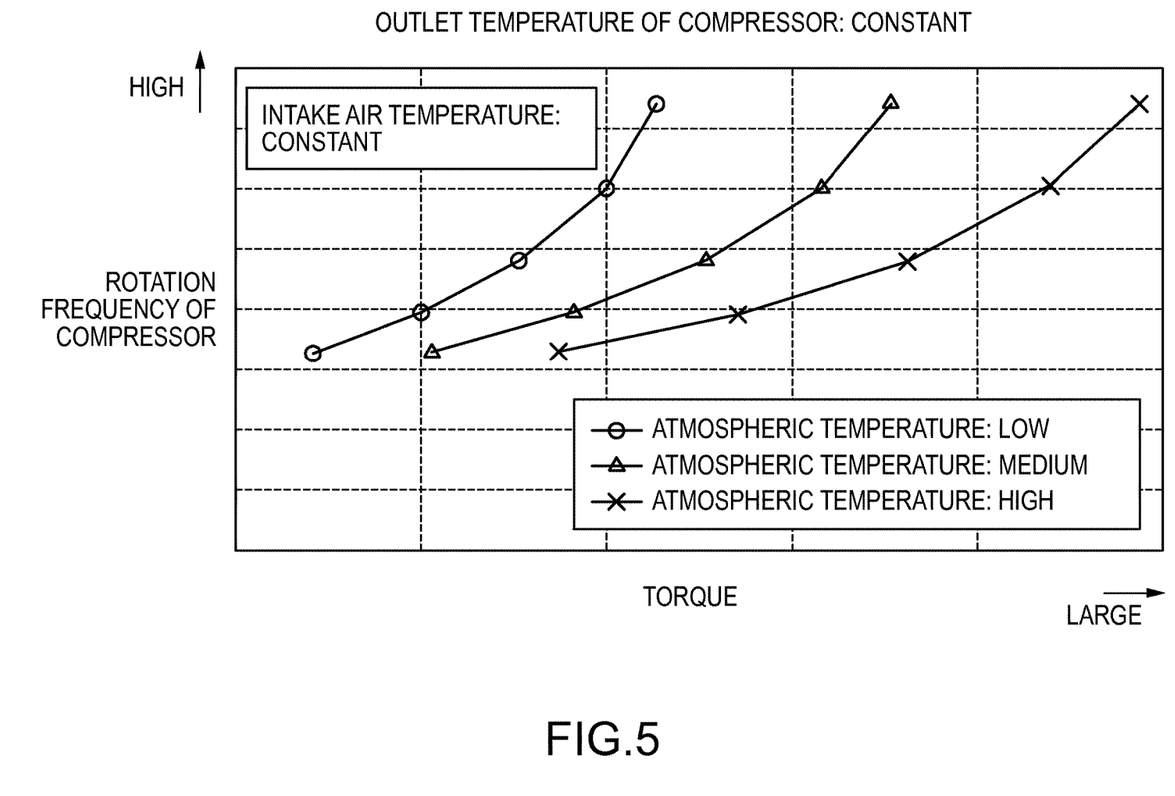
FIG. 5 shows a correlation among the atmospheric pressure, a torque of a compressor, and a rotation frequency of the compressor under a constant compressor outlet temperature.

FIG. 5 illustrates a correlation among the atmospheric pressure, the torque of the compressor 21, and the rotation frequency of the compressor 21 when the intake air temperature of the cathode gas suctioned by the compressor 21 (inlet temperature) is constant. FIG. 5 shows examples of a correlation between the torque and the rotation frequency of the compressor 21 when the discharge temperature of the compressor 21 is restricted to the same temperature under different atmospheric pressures.

As shown in FIG. 5, under a constant atmospheric pressure, the rotation frequency of the compressor 21 increases as the torque of the compressor 21 increases. This correlation between the torque and the rotation frequency of the compressor 21 shifts toward a direction of an increase in the torque of the compressor 21 (a rightward direction in the figure) along with an increase in the atmospheric pressure. As indicated above, an overall increase in the torque of the compressor 21 causes an increase in the discharge temperature of the compressor 21. This makes it necessary to restrict the rotation frequency of the compressor 21 to a low rotation frequency.

For this reason, in a case where the compressor 21 is driven with a constant torque, the discharge temperature of the compressor 21 exceeds an upper temperature limit unless the rotation frequency of the compressor 21 is restricted to a lower rotation frequency under a higher atmospheric pressure. This is presumably because the higher the atmospheric pressure is, the higher the density of the cathode gas suctioned by the compressor 21 is.

As a measure against the foregoing issue, the correction value computation block B121 obtains the correction value by dividing the ROM constant by the atmospheric pressure. The ROM constant is an atmospheric pressure value serving as the basis of correction of the actual torque of the compressor 21, and is set to 101.3 kilopascals (kPa) in the present embodiment. The atmospheric pressure is detected by an atmospheric pressure sensor provided in the fuel cell system or a vehicle cabin.

The correction value computation block 121 sets a smaller correction value under a higher atmospheric pressure, and sets a larger correction value under a lower atmospheric pressure. The correction value computation block 121 then outputs the correction value to a correction torque computation block B122.

The correction torque computation block B122 obtains a correction torque by multiplying the actual torque of the compressor 21 by the correction value. It should be noted that the actual torque of the compressor 21 is detected by, for example, a torque sensor provided in the compressor 21.

The correction torque computation block B122 sets a smaller correction torque under a higher atmospheric pressure so as to reduce the rotation frequency limit of the compressor 21, and sets a larger correction torque under a lower atmospheric pressure so as to increase the rotation frequency limit of the compressor 21.

A rotation frequency limit computation block B123 obtains the rotation frequency limit of the compressor 21 based on the intake air temperature and the correction torque. The rotation frequency limit of the compressor 21 changes not only depending on the atmospheric pressure, but also depending on the intake air temperature of air suctioned by the compressor 21.

Figure 6:
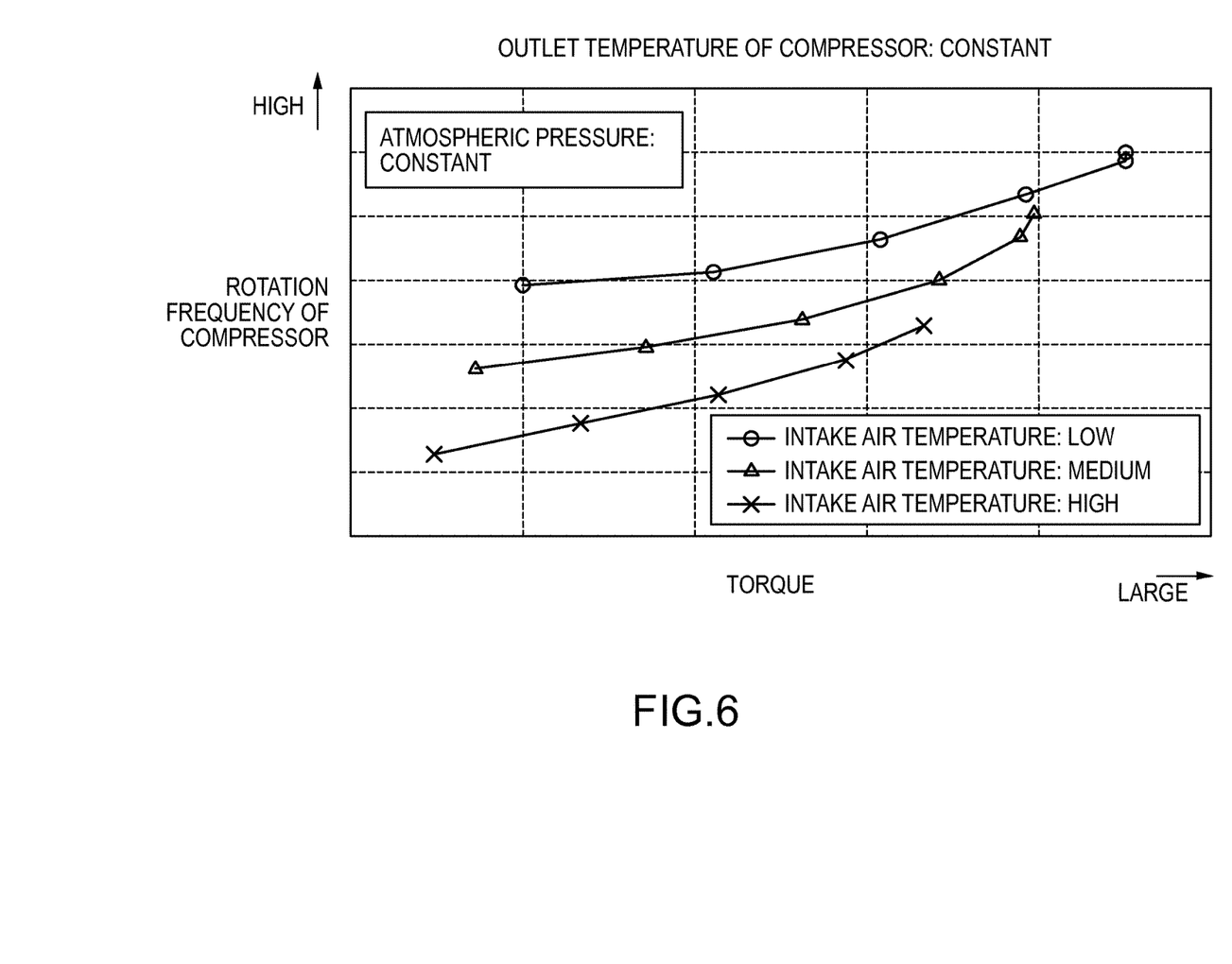
FIG. 6 shows a correlation among an intake air temperature, the torque of the compressor, and the rotation frequency of the compressor under a constant compressor outlet temperature.

FIG. 6 shows an example relationship among the intake air temperature, the correction torque, and the rotation frequency of the compressor. This relationship will now be described. It is desirable to set the discharge temperature of the compressor to, for example, 200° C. FIG. 6 shows examples of a correlation between the torque and the rotation frequency of the compressor under different intake air temperatures in an environment under an atmospheric pressure of 101.3 kPa.

As shown in FIG. 6, under a constant intake air temperature, the rotation frequency increases as the torque increases. Under a constant torque, the rotation frequency increases as the intake air temperature decreases. By utilizing such properties, the rotation frequency limit computation block B123 obtains the rotation frequency limit of the compressor 21.

Specifically, rotation frequency limit tables are prestored in the rotation frequency limit computation block B123 in one-to-one relationship with correction torques. Each of the rotation frequency limit tables shows a relationship between the intake air temperature and the rotation frequency limit of the compressor 21. Once the rotation frequency limit computation block B123 has acquired the intake air temperature and the correction torque, it refers to a rotation frequency limit table specified by the correction torque, and calculates the rotation frequency limit corresponding to the intake air temperature.

A deviation computation block B124 computes a deviation between the actual rotation frequency and the rotation frequency limit of the compressor 21.

A feedback control block B125 sets a WRD inlet pressure limit so that the deviation computation block B124 outputs a deviation of zero.

As indicated above, in order to obtain the WRD inlet pressure limit, the WRD inlet pressure limit computation block B120 calculates the rotation frequency limit based on the torque of the compressor 21, the state of the cathode gas suctioned by the compressor 21, i.e., the intake air temperature, and the atmospheric pressure.

Specifically, once the WRD inlet pressure limit computation block B120 has acquired the intake air temperature and the actual torque, it corrects the actual torque so that the rotation frequency limit of the compressor 21 decreases as the atmospheric pressure increases. The WRD inlet pressure limit computation block B120 then refers to a rotation frequency limit table generated based on an upper limit value of the discharge temperature of the compressor 21, and calculates the rotation frequency limit of the compressor 21 based on the correction torque and the intake air temperature.

In this way, the WRD inlet pressure limit can be appropriately set in accordance with the state of the cathode gas suctioned by the compressor 21 so that the discharge temperature of the compressor 21 does not exceed the upper limit value.

Figure 7:
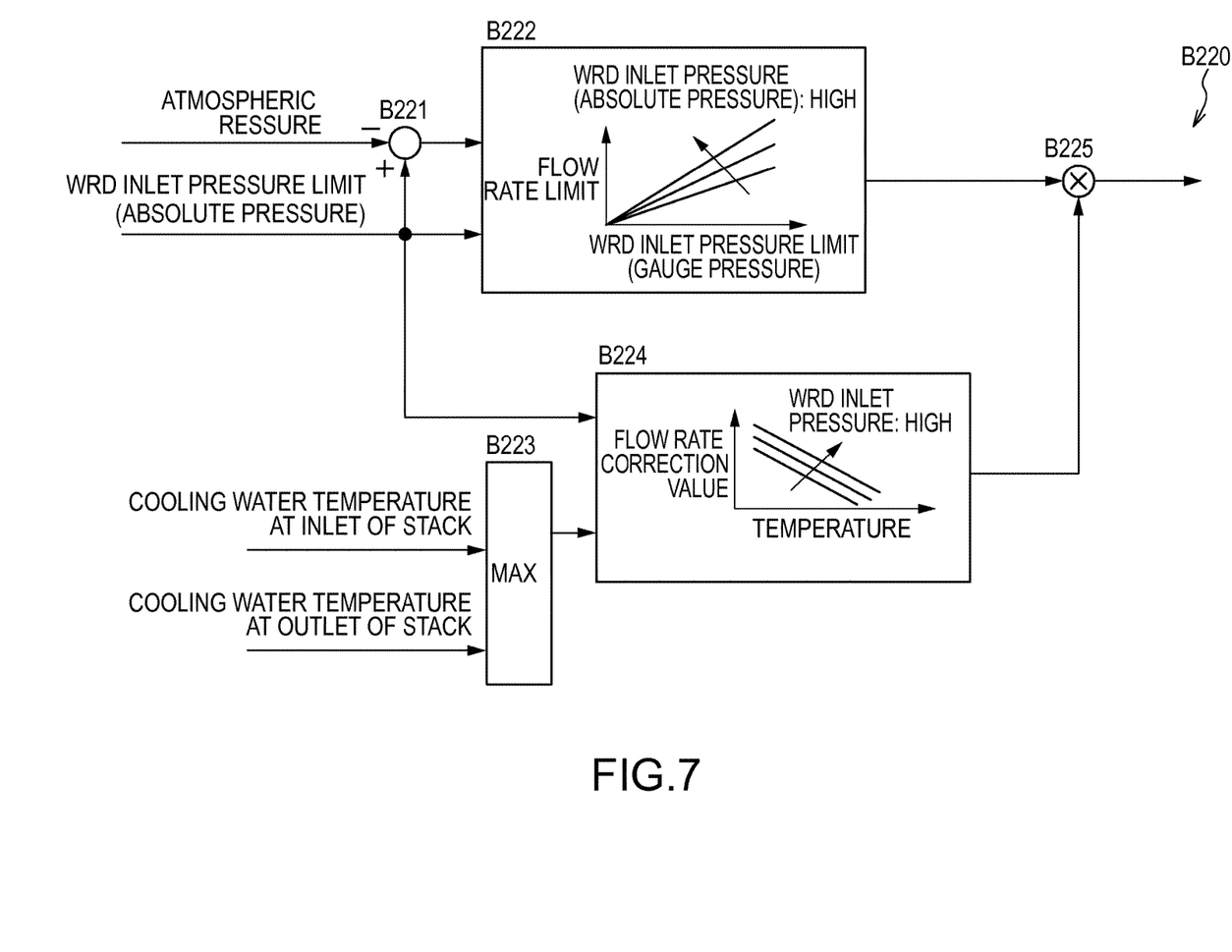
FIG. 7 illustrates a detail of a stack flow rate limit computation block.

FIG. 7 illustrates a detail of the stack flow rate limit computation block B220.

A gauge pressure computation block B221 computes a WRD inlet pressure limit (gauge pressure) based on a WRD inlet pressure limit (absolute pressure) and the atmospheric pressure.

A flow rate limit computation block B222 obtains a flow rate limit (base value) of the compressor 21 based on the WRD inlet pressure limits, i.e., the absolute pressure and the gauge pressure.

A maximum select block B223 outputs a higher one of the cooling water temperatures at the inlet and the outlet of the fuel cell stack.

A flow rate correction value computation block B224 obtains a flow rate correction value based on the WRD inlet pressure limit (absolute pressure) and the cooling water temperature output from the maximum select block B223.

A flow rate limit computation block B225 obtains a stack flow rate limit by multiplying the flow rate limit (base value) output from the flow rate limit computation block B222 by the flow rate correction value output from the flow rate correction value computation block B224.

Figure 8:
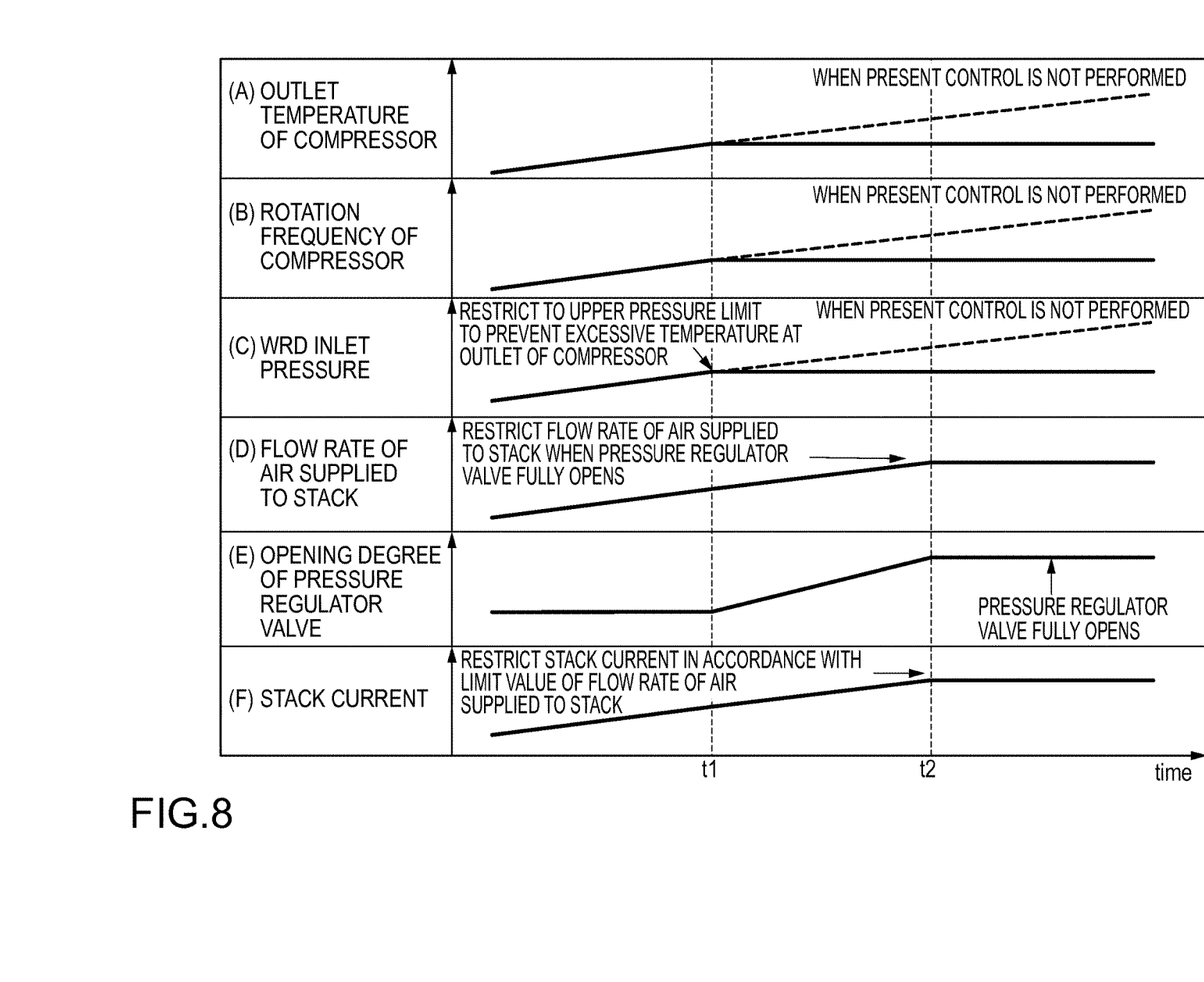
FIG. 8 is a time chart showing operational effects achieved by performing control according to the present embodiment.

FIG. 8 is a time chart showing the operational effects achieved by performing the present control.

FIG. 8 pertains to a situation in which the outlet temperature of the compressor is gradually increasing. If no control is performed, the outlet temperature excessively increases as indicated by a dash line.

In contrast, in the present embodiment, at time t1 at which the outlet temperature of the compressor reaches the upper temperature limit (e.g., 200° C.), the rotation frequency of the compressor is restricted to the rotation frequency limit computed by the rotation frequency limit computation block B123. This prevents an excessive increase in the WRD inlet pressure, and the outlet temperature of the compressor is accordingly maintained at the upper temperature limit.

In the present embodiment, the following control is further performed. In order to restrict the WRD inlet pressure from increasing, the opening degree of the pressure regulator valve is increased ((E) in FIG. 8). When the opening degree of the pressure regulator valve is maximized at time t2, the flow rate of the air supplied to the fuel cell stack is restricted ((D) in FIG. 8), and the stack current is restricted in accordance with such a restriction in the air ((F) in FIG. 8). Power generation can thus be sustained even if pressure and the flow rate are restricted for the purpose of avoiding an excessive temperature at the outlet of the compressor.

As described above, the present embodiment restricts the operation amount of the compressor 21 and/or the opening degree of the pressure regulator valve 24 based on two parameters (the inlet temperature and the torque of the compressor), without using a temperature sensor located downstream relative to the compressor and pressure sensors located upstream and downstream relative to the compressor. In this way, the discharge temperature (discharge pressure) of the compressor can be restricted without randomly increasing the number of sensors.

In the present embodiment, the operation amount of the compressor 21 and the opening degree of the pressure regulator valve are controlled using the target WRD inlet pressure (target cathode pressure) and the WRD inlet pressure sensor value (actual cathode pressure).

Simply performing direct restriction of the operation amount (rotation frequency) of the compressor leaves inconsistency between the target cathode pressure, which is based on a power generation request to the fuel cell stack, and the actual cathode pressure. For example, in a case where feedback control (PI control) is applied to the compressor, an integral term could possibly have a maximum value. If the restriction is removed in this situation, hunting could possibly occur due to unintended values of the operation amount of the compressor and the opening degree of the pressure regulator valve based on the power generation request. In contrast, the present embodiment restricts the target cathode pressure based on the aforementioned two parameters, and hence restricts at least one of the operation amount of the compressor and the opening degree of the pressure regulator valve. This allows for suppression of the aforementioned unfavorable situations even after removal of the restriction.

The present embodiment particularly sets the rotation frequency limit of the compressor 21 based on the aforementioned two parameters, and calculates the pressure limit (WRD inlet pressure limit) based on the rotation frequency limit and the actual rotation frequency of the compressor 21.

In general, a rotation frequency sensor is often used to control the rotation frequency of the compressor 21. The rotation frequency sensor has better sensing precision than a temperature sensor, a pressure sensor, etc. The present embodiment achieves the precise conformity to the discharge temperature (discharge pressure) of the compressor 21 by using such a rotation frequency sensor, without randomly increasing the number of sensors including a temperature sensor located downstream relative to the compressor, and pressure sensors located upstream and downstream relative to the compressor.

In the present embodiment, the cathode flow rate is controlled through the operation amount of the compressor and/or the opening degree of the pressure regulator valve based on a lower one of the target stack flow rate (first target flow rate) and the flow rate limit (second target flow rate) of the cathode gas. Note that the target stack flow rate is set based on the power generation request to the fuel cell stack, whereas the flow rate limit is computed based on the pressure limit.

When restricting pressure in conformity to the heat resistance temperature downstream relative to the compressor 21, an increase in the cathode flow rate associated with an increase in the output from the fuel cell stack 10 may lead to the possibility that a further reduction in pressure cannot be accomplished even with a fully-open pressure regulator valve 24. There is a concern that, even if the pressure regulator valve 24 is fully opened, an increase in the cathode flow rate causes a pressure increase and results in a failure to maintain the temperature downstream relative to the compressor at the heat resistance temperature.

In contrast, the present embodiment controls the flow rate of the cathode gas by calculating a flow rate limit based on the pressure limit of the cathode gas. In this way, the pressure regulator valve 24 fully opens in response to an increase in the output from the fuel cell stack 10. Furthermore, in an attempt to increase the flow rate in association with the increase in the output, the flow rate of the compressor 21 is restricted, and thereby suppressing the aforementioned unfavorable situations.

In the present embodiment, the torque value of the compressor 21 used in calculation of the rotation frequency limit of the compressor 21 is corrected in accordance with a change in the atmospheric pressure. In the fuel cell system, the overall torque of the compressor 21 increases and the discharge temperature of the compressor 21 easily increases as the atmospheric pressure increases. As a measure against the foregoing issue, the torque value of the compressor 21 is corrected so that the rotation frequency limit of the compressor 21 decreases as the atmospheric pressure increases. In this way, the rotation frequency of the compressor 21 is restricted to a low rotation frequency under a high atmospheric pressure. It is thus possible to prevent the discharge temperature of the compressor 21 from exceeding the upper limit value in a more reliable manner.

Furthermore, in a case where the fuel cell system is used in a high-altitude region, the torque value of the compressor 21 is corrected so as to increase due to a low atmospheric pressure. The correction increases the rotation frequency limit of the compressor 21, thereby suppressing excessive restriction in the rotation frequency of the compressor 21.

In the present embodiment, the stack current (fuel cell output) is restricted based on the stack flow rate sensor value (cathode gas flow rate) and the WRD inlet pressure sensor value (actual cathode pressure). When the temperature downstream relative to the compressor has exceeded the heat resistance temperature for some reason, restricting pressure and the flow rate for conforming to the heat resistance temperature may lead to the possibility that a minimum oxygen partial pressure cannot be ensured in a case where the fuel cell is required to produce large output.

In contrast, the present embodiment controls the fuel cell to produce optimal output corresponding to the pressure limit and the flow rate limit, thereby suppressing a failure to achieve the minimum oxygen partial pressure when pressure and the flow rate are restricted to ensure the heat resistance. That is to say, power generation can be sustained even if pressure and the flow rate are restricted for the purpose of preventing an excessive temperature at the outlet of the compressor.

The present embodiment has discussed an example in which the rotation frequency limit of the compressor 21 is calculated based on the intake air temperature and the actual torque of the compressor 21 so as to compute the WRD inlet pressure limit. Alternatively, an estimated torque value may be used in place of the actual torque as will be described below.

(Second Embodiment)

Figure 9:
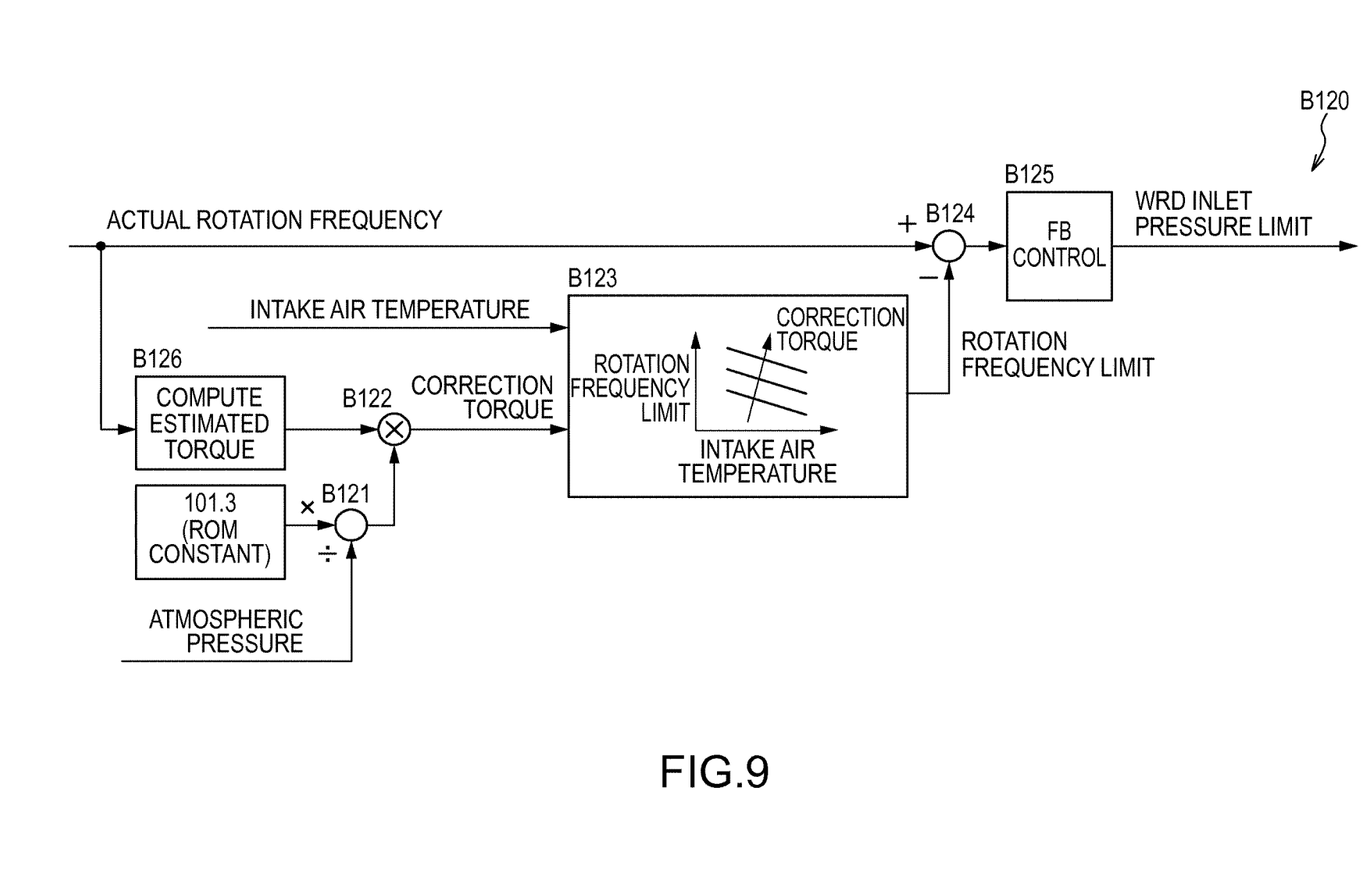
FIG. 9 illustrates a detail of a WRD inlet pressure limit computation block according to a second embodiment of the present invention.

FIG. 9 shows the WRD inlet pressure limit computation block B120 according to a second embodiment of the present invention. This WRD inlet pressure limit computation block B120 includes an estimated torque calculation block B126 in addition to the constituents of the WRD inlet pressure limit computation block shown in FIG. 4. As other constituents are the same as those shown in FIG. 4, the same reference numerals will be given to them and a description thereof will be omitted.

The estimated torque calculation block B126 receives, as input, the actual rotation frequency detected by the rotation frequency sensor provided in the compressor 21 and the actual intake air flow rate detected by the cathode flow rate sensor 202. The estimated torque calculation block B126 estimates the torque of the compressor 21 based on the actual rotation frequency and the actual intake air flow rate of the compressor 21.

For example, the estimated torque calculation block B126 stores a torque estimation map in which estimated torque values of the compressor 21 are associated in one-to-one relationship with operation points, each of which represents a set of the rotation frequency and the intake air flow rate of the compressor 21. Once the estimated torque calculation block B126 has acquired the actual rotation frequency and the actual intake air flow rate of the compressor 21, it refers to the torque estimation map and calculates an estimated torque value associated with an operation point identified by the actual rotation frequency and the actual intake air flow rate. The estimated torque calculation block B126 outputs this estimated torque value to the correction torque computation block B122 as the torque of the compressor 21. It should be noted that the torque estimation map is set, for example based on data obtained from experiments.

According to the above-described second embodiment, the torque of the compressor 21 is estimated by using the rotation frequency sensor provided in the compressor 21 and the cathode flow rate sensor 202 located upstream relative to the compressor 21. In this way, the torque of the compressor 21 can be acquired without newly providing the compressor 21 with a torque sensor. The WRD inlet pressure limit can thus be computed without increasing the number of sensors.

The present embodiment has discussed an example in which the torque of the compressor 21 is estimated based on the actual rotation frequency and the actual intake air flow rate of the compressor 21. Alternatively, the torque may be estimated using the pressure downstream relative to the compressor 21 in place of the actual rotation frequency.

The above-described embodiments of the present invention merely illustrate a part of example applications of the present invention, and specific configurations of the above-described embodiments are not intended to limit a technical scope of the present invention.

For example, although the present embodiments have discussed an example in which a minimum air flow rate required to ensure an oxygen partial pressure is set as the target stack flow rate (first target flow rate), no limitation is intended in this regard. For example, the target stack flow rate may be set based on a required air flow rate, such as an air flow rate necessary for maintaining a moisture level of the electrolyte membranes, rather than a minimum air flow rate required to ensure an oxygen partial pressure.

The present application claims a priority of Japanese Patent Application No. 2013-59817 filed with the Japan Patent Office on Mar. 22, 2013, and all the contents of which are hereby incorporated by reference.

The invention claimed is:

1. A fuel cell system for supplying an anode gas and a cathode gas, and generating power through an electrochemical reaction of the anode gas and the cathode gas in accordance with a load, the fuel cell system comprising:
   a compressor configured to supply the cathode gas to a fuel cell stack;
   a pressure regulator valve configured to adjust a pressure of the cathode gas in the fuel cell stack;
   a controller programmed to:
      set a target cathode pressure based on a power generation request to the fuel cell stack;
      control an operation amount of the compressor and an opening degree of the pressure regulator valve based on the target cathode pressure;
      detect an actual rotation frequency of the compressor;
      restrict the operation amount of the compressor and/or the opening degree of the pressure regulator valve based on two parameters, the two parameters being an inlet temperature of the compressor and a torque of the compressor;
      set a rotation frequency limit of the compressor based on the two parameters;
      calculate a pressure limit based on the rotation frequency limit and the actual rotation frequency; and
      restrict the operation amount of the compressor and/or the opening degree of the pressure regulator valve based on the pressure limit,
   wherein air pressure sensors are not provided both upstream and downstream relative to the compressor.

2. The fuel cell system according to claim 1, wherein the controller is further programmed to:
   set a first target flow rate based on the power generation request to the fuel cell stack;
   compute a second target flow rate of the cathode gas based on the pressure limit; and
   control a cathode flow rate through the operation amount of the compressor and/or the opening degree of the pressure regulator valve based on a lower one of the first target flow rate and the second target flow rate.

3. The fuel cell system according to claim 2, wherein the second target flow rate has a smaller value than the first target flow rate calculated based on the power generation request to the fuel cell stack when the pressure regulator valve is fully open.

4. The fuel cell system according to claim 1, wherein the controller is further programmed to correct the torque of the compressor so that the rotation frequency limit of the compressor decreases as an atmospheric pressure increases.

5. The fuel cell system according to claim 1, wherein the controller is further programmed to:
   detect an actual cathode pressure in the fuel cell stack; and
   detect a cathode gas flow rate,
   wherein a fuel cell output is restricted based on the cathode gas flow rate and the actual cathode pressure.

6. A control method for a fuel cell system including a compressor for supplying a cathode gas to a fuel cell stack and a pressure regulator valve for adjusting a pressure of the cathode gas in the fuel cell stack, the fuel cell system supplying an anode gas and the cathode gas and generating power through an electrochemical reaction of the anode gas and the cathode gas in accordance with a load, the control method comprising:
   setting a target cathode pressure based on a power generation request to the fuel cell stack;
   controlling an operation amount of the compressor and an opening degree of the pressure regulator valve based on the target cathode pressure;
   detecting an actual rotation frequency of the compressor; and restricting at least one of the operation amount of the compressor and/or the opening degree of the pressure regulator valve based on two parameters, the two parameters being an inlet temperature of the compressor and a torque of the compressor, wherein the restricting includes
  setting a rotation frequency limit of the compressor based on the two parameters,
  calculating a pressure limit based on the rotation frequency limit and the actual rotation frequency, and
  restricting the operation amount of the compressor and/or the opening degree of the pressure regulator valve based on the pressure limit,
wherein air pressure sensors are not provided both upstream and downstream relative to the compressor.

* * * * *